(12) United States Patent
Tennessen et al.

(10) Patent No.: US 8,541,127 B2
(45) Date of Patent: Sep. 24, 2013

(54) OVERMOLDED THERMAL INTERFACE FOR USE WITH A BATTERY COOLING SYSTEM

(75) Inventors: Peter Thomas Tennessen, San Francisco, CA (US); Jeffrey C. Weintraub, San Carlos, CA (US); Weston Arthur Hermann, Palo Alto, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 334 days.

(21) Appl. No.: 13/102,889

(22) Filed: May 6, 2011

(65) Prior Publication Data
US 2011/0206969 A1 Aug. 25, 2011

Related U.S. Application Data (63) Continuation-in-part of application No. 12/655,995, filed on Jan. 12, 2010, now Pat. No. 8,263,250, which is a continuation-in-part of application No. 11/820,008, filed on Jun. 18, 2007, now abandoned.

(51) Int. Cl.
*H01M 10/50* (2006.01)
*H01M 2/18* (2006.01)
*H01M 2/14* (2006.01)
*H01M 2/16* (2006.01)
*H01M 2/00* (2006.01)

(52) U.S. Cl.
USPC ........... 429/120; 429/130; 429/142; 429/129; 429/148

(58) Field of Classification Search
USPC .......................... 429/120, 130, 142, 129, 148
See application file for complete search history.

(56) References Cited

U.S. PATENT DOCUMENTS
7,291,420 B2 * 11/2007 Bitsche et al. ................ 429/120

FOREIGN PATENT DOCUMENTS
JP 2002-373708 * 12/2002

* cited by examiner

*Primary Examiner* — Helen O Conley
(74) *Attorney, Agent, or Firm* — Patent Law Office of David G. Beck (57) ABSTRACT

A cooling manifold assembly for use in a battery pack thermal management system is provided. The cooling manifold assembly includes a coolant tube that is interposed between at least a first row of cells and a second row of cells, where the first and second rows of cells are adjacent and preferably offset from one another. A thermal interface layer is overmolded onto the cooling tube, the thermal interface layer including a plurality of pliable fingers that extend away from the cooling tube and are interposed between the cooling tube and the first row of cells, and interposed between the cooling tube and the second row of cells, where the pliable fingers are deflected by, and in thermal contact with, the cells of the first and second rows of cells.

22 Claims, 8 Drawing Sheets

OVERMOLDED THERMAL INTERFACE FOR USE WITH A BATTERY COOLING SYSTEM

CROSS-REFERENCE TO RELATED APPLICATION

This application is a continuation-in-part of U.S. patent application Ser. No. 12/655,995, filed 12 Jan. 2010, which is a continuation-in-part of U.S. patent application Ser. No. 11/820,008, filed 18 Jun. 2007, the disclosures of which are incorporated herein by reference for any and all purposes.

FIELD OF THE INVENTION

The present invention relates generally to battery cooling systems and, more particularly, to a means for improving the manufacturability and performance of a battery cooling system.

BACKGROUND OF THE INVENTION

Batteries can be broadly classified into primary and secondary batteries. Primary batteries, also referred to as disposable batteries, are intended to be used until depleted, after which they are simply replaced with one or more new batteries. Secondary batteries, more commonly referred to as rechargeable batteries, are capable of being repeatedly recharged and reused, therefore offering economic, environmental and ease-of-use benefits compared to a disposable battery.

Although rechargeable batteries offer a number of advantages over disposable batteries, this type of battery is not without its drawbacks. In general, most of the disadvantages associated with rechargeable batteries are due to the battery chemistries employed, as these chemistries tend to be less stable than those used in primary cells. Due to these relatively unstable chemistries, secondary cells often require special handling during fabrication. Additionally, secondary cells such as lithium-ion cells tend to be more prone to thermal runaway than primary cells, thermal runaway occurring when the internal reaction rate increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures.

Thermal runaway is of major concern since a single incident can lead to significant property damage. When a battery undergoes thermal runaway, it typically emits a large quantity of smoke, jets of flaming liquid electrolyte, and sufficient heat to lead to the combustion and destruction of materials in close proximity to the cell. If the cell undergoing thermal runaway is surrounded by one or more additional cells as is typical in a battery pack, then a single thermal runaway event can quickly lead to the thermal runaway of multiple cells which, in turn, can lead to much more extensive collateral damage. Regardless of whether a single cell or multiple cells are undergoing this phenomenon, if the initial fire is not extinguished immediately, subsequent fires may be caused that dramatically expand the degree of property damage. For example, the thermal runaway of one or more batteries within the battery pack of a hybrid or electric vehicle may destroy not only the car, but may lead to a car wreck if the car is being driven or the destruction of its surroundings if the car is parked.

There are a number of approaches that may be taken to reduce the risk of thermal runaway. For example, to prevent batteries from being shorted out during storage and/or handling, precautions can be taken such as insulating the battery terminals and using specifically designed battery storage containers. Another approach is to develop new cell chemistries and/or modify existing cell chemistries. For example, research is currently underway to develop composite cathodes that are more tolerant of high charging potentials. Research is also underway to develop electrolyte additives that form more stable passivation layers on the electrodes.

Active battery cooling is another approach that is typically used to reduce thermal runaway risk as well as optimize battery performance and lifetime. Some active battery cooling systems blow air across the batteries themselves, or across a radiator that is thermally coupled to the batteries. Alternately, a battery cooling system may use cooling tubes and a liquid coolant to withdraw heat from the batteries. When the cooling system uses cooling tubes, care must be taken to ensure that the coolant tubes do not short or otherwise electrically interfere with the batteries. Accordingly, a typical coolant tube is either manufactured from an electrically insulating material (e.g., polypropylene), or manufactured from a metal that is coated with an electrically insulating material. Regardless of the material used to fabricate the cooling tube, a thermally conductive material is often positioned between the cooling tube and the batteries in order to improve heat removal efficiency. Unfortunately, due to the material limitations of such thermally conductive materials as well as the minimal spacing between the batteries and the cooling tube, insertion of the thermally conductive interface material is a very labor-intensive process, thus dramatically affecting battery pack cost and manufacturability.

Accordingly, what is needed is a means for improving the manufacturability of a battery pack that uses a battery cooling system, and in particular, for improving the cost, mass, performance and ease of production for such a battery pack. The present invention provides such a means.

SUMMARY OF THE INVENTION

The present invention provides a cooling manifold assembly for use in a battery pack thermal management system. The cooling manifold assembly includes a coolant tube that is interposed between at least a first row of cells and a second row of cells, where the first and second rows of cells are adjacent and preferably offset from one another. A thermal interface layer is overmolded onto the cooling tube, the thermal interface layer including a plurality of material extensions, referred to as pliable fingers, that extend away from the cooling tube and are interposed between the cooling tube and the first row of cells, and interposed between the cooling tube and the second row of cells, where the pliable fingers are deflected by, and in thermal contact with, the cells comprising the first and second rows of cells. The cooling tube may be contoured, specifically with a first plurality of contours coinciding with the cells in the first row of cells, and with a second plurality of contours coinciding with the cells in the second row of cells. Preferably the radius of curvature of the first and second pluralities of contours is approximately equal to the outer radius of curvature of the cells. The thermal interface layer may be comprised of a material with a dielectric strength of at least 3 kV-mm$^{-1}$; alternately, with a dielectric strength of at least 7 kV-mm$^{-1}$. The thermal interface layer may be comprised of a material with a thermal conductivity of greater than 0.2 W-m$^{-1}$K$^{-1}$; alternately, with a thermal conductivity of greater than 1.0 W-m$^{-1}$K$^{-1}$. The thermal interface layer may be comprised of a material with a Shore A hardness value of less than 60. The thermal interface layer may be comprised of a material with a tensile strength greater than 5 MPa. Preferably the thermal interface layer and each cell's outer surface has a static coefficient of friction of less than 0.3. Exemplary materials for the thermal interface layer include silicone elastomer blends and thermoplastic elastomers. Exemplary materials for the cooling tube include metals such as aluminum, an aluminum alloy, steel or copper. Preferably the cooling tube has an elongated cross-section with the elongated side surfaces adjacent to the first and second rows of cells. The cooling tube may include a single coolant channel or multiple coolant channels. Preferably the cooling manifold assembly is coupled to a vehicle battery cooling system.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein refers to either an all-electric vehicle, also referred to as an EV, a plug-in hybrid vehicle, also referred to as a PHEV, or a hybrid vehicle (HEV), a hybrid vehicle utilizing multiple propulsion sources one of which is an electric drive system. It should be understood that identical element symbols used on multiple figures refer to the same component, or components of equal functionality. Additionally, the accompanying figures are only meant to illustrate, not limit, the scope of the invention and should not be considered to be to scale.

Figure 1:
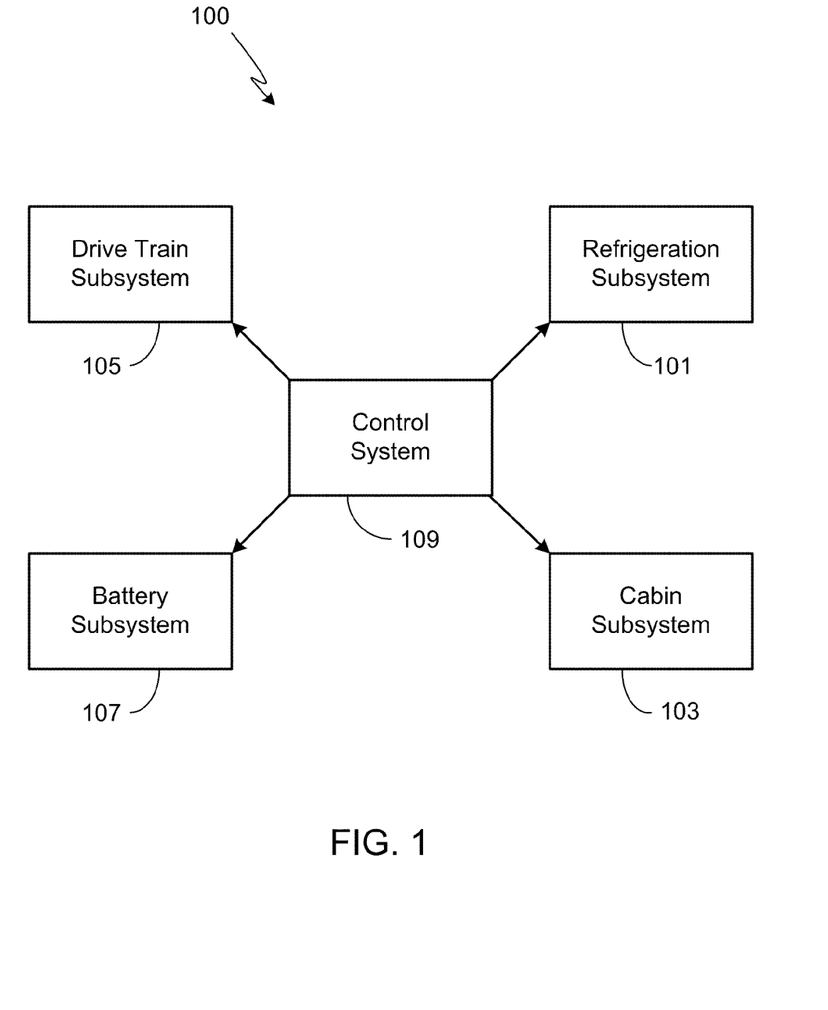
FIG. 1 provides a high level diagram of the various subsystems used in the thermal management system of an electric vehicle.

FIG. 1 is a high level diagram that illustrates the basic subsystems within the thermal management system 100 of a typical electric vehicle. In general, the thermal management system of such a vehicle includes a refrigeration subsystem 101, a passenger cabin subsystem 103, a drive train subsystem 105, and a battery subsystem 107. Thermal management system 100 also includes a control system 109. While it will be appreciated that the present invention does not require a specific system configuration, further details for each of the subsystems shown in FIG. 1 is provided below to illustrate one possible system for use with the present invention.

Refrigeration subsystem 101 is designed to be thermally coupled to one or more of the other thermal subsystems comprising system 100 whenever it is necessary, or desirable, to reduce the temperature in the thermally-coupled subsystem. Refrigeration subsystem 101 may utilize a refrigerant (e.g., R134a) compression system, a thermo-electric cooler, or other means. In a typical configuration, subsystem 101 includes a compressor that compresses the low temperature refrigerant vapor in the subsystem into a high temperature vapor. The refrigerant vapor then dissipates a portion of the captured heat when it passes through a condenser, thereby leading to a phase change from vapor to liquid, the liquid remaining at a high temperature and pressure. The performance of the condenser may be enhanced by using a blower fan. The liquid phase refrigerant then passes through a receiver-dryer which removes moisture from the condensed refrigerant. Typically the refrigerant line is coupled to a cabin evaporator within cab subsystem 103.

Heating, ventilation and cooling (HVAC) subsystem 103 provides temperature control for the vehicle's passenger cabin, typically via a plurality of ducts and vents. Preferably HVAC subsystem 103 includes one or more fans that are used to circulate air throughout the cabin on demand, regardless of whether the air is heated, cooled, or simply fresh air from outside the vehicle. To provide cool air, refrigerant from refrigeration system 101 is circulated through the cabin evaporator. To provide warm air during normal vehicle operation, HVAC subsystem 103 may utilize a heater, for example a PTC heater integrated within the cabin evaporator. HVAC subsystem 103 may also include means such as a heat exchanger for transferring thermal energy from either drive train subsystem 105 or battery subsystem 107 to the HVAC subsystem.

In an electric vehicle, system 100 may include a drive train subsystem 105 that is used to cool the drive motor or motors (i.e., the vehicle's traction motor). Typically subsystem 105 will include a power train cooling loop. Preferably the power train cooling loop is also thermally coupled to other vehicle electronic components, for example the power electronics module and inverter for the motor(s). If the system includes a battery charger for charging a rechargeable battery within battery subsystem 107 using an external power source, preferably the charger is also coupled to the power train cooling loop. Alternately, the charger may be coupled to the battery system cooling loop. Normally the power train cooling loop will include a coolant circulation pump, a radiator for discharging the heat to the ambient atmosphere, and a coolant reservoir. The system may also include a fan for forcing air through the radiator when insufficient air is passing through the radiator to achieve the desired level of cooling, for example when the vehicle is not moving.

Battery subsystem 107 includes a battery, and typically a plurality of batteries, coupled to a coolant loop through which a coolant (i.e., a heat transfer medium) is pumped via one or more circulation pumps. As described in detail below, the coolant loop includes one or more coolant conduits that are in thermal communication with the battery(s). Although a dedicated cooling subsystem may be used in conjunction with subsystem 107, preferably the coolant contained within the coolant loop is cooled via heat transfer with the refrigerant of refrigeration subsystem 101 using one or more heat exchangers. Additionally, the coolant loop may also be thermally coupled to a heater (e.g., a PTC heater), thus insuring that the temperature of batteries can be maintained within their preferred operating range regardless of the ambient temperature.

It will be appreciated that there are numerous techniques that may be used by control system 109 to control the operation of the individual thermal management subsystems in general, and more specifically, the amount of cooling supplied by refrigeration subsystem 101 to the other subsystems. Typically control system 109 uses a plurality of temperature detectors to monitor the temperature within the various vehicle components (e.g., batteries, motor, drive electronics, etc.), within one or more regions of the coolant loops and within one or more locations within the passenger cabin. The monitored temperatures at these various locations are used by control system 109 to determine the operation of the various thermal management subsystems. In response to the monitored temperatures and the desired temperature range for the cabin and the various vehicle components, the amount of heating and/or cooling applied by each subsystem is regulated, for example via flow valves within the coolant loops, pump rates of the various circulation pumps, heater operation, and blower fan operation. Control system 109 may operate automatically based on programming implemented by a processor, or system 109 may be manually controlled, or system 109 may use some combination of manual and automated control.

Figure 2:
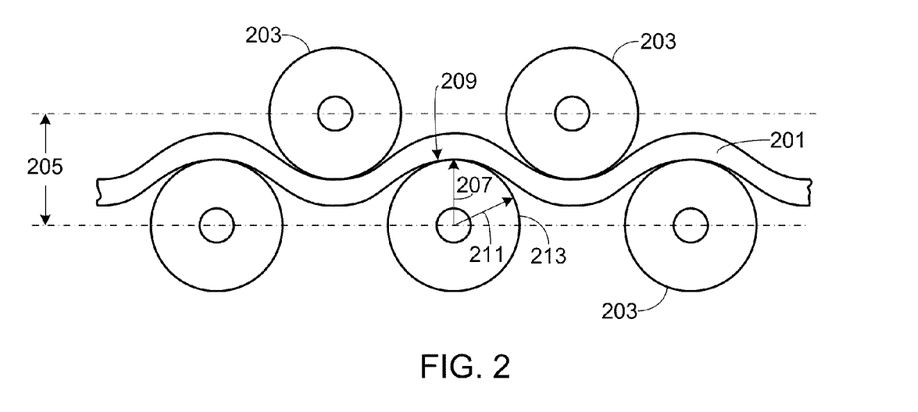
FIG. 2 is a top-down view of a portion of a cooling manifold assembly inserted between two rows of cells.
Figure 3:
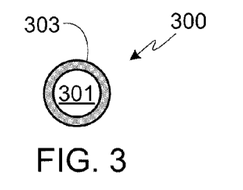
FIG. 3 is a cross-sectional view of a cooling tube with a circular cross-section.

FIG. 2 is a top-down view of a portion of a cooling tube 201 inserted between a plurality of cells 203. Although not required by the invention, preferably cooling tube 201 has a wavy profile, also referred to as a scalloped profile, as shown. The illustrated wavy profile of cooling tube 201 serves several purposes. First, it allows a greater portion of each battery to be in thermal contact with the cooling tube, thereby improving heat withdrawal efficiency. Second, it improves the packing density of a battery pack comprised of cells 203 by allowing the separation distance 205 between adjacent cell rows to be minimized. Preferably the radius of curvature 207 of each contour of the exterior surface 209 of cooling tube 201 is approximately equal to the radius of curvature 211 of the exterior battery casing 213.

Figure 4:
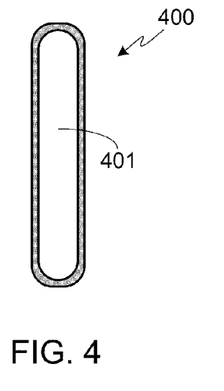
FIG. 4 is a cross-sectional view of a cooling tube with an elongated cross-section and a single coolant channel.
Figure 5:
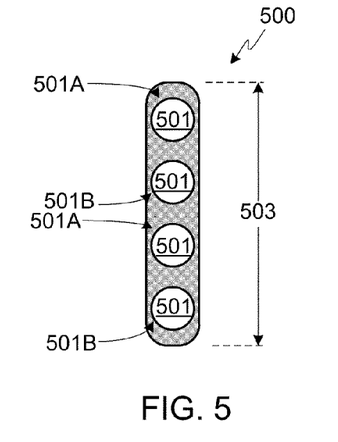
FIG. 5 is a cross-sectional view of a cooling tube with an elongated cross-section and multiple coolant channels.
Figure 6:
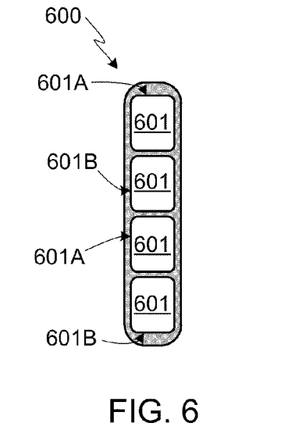
FIG. 6 is a cross-sectional view of an alternate cooling tube with an elongated cross-section and multiple coolant channels.

FIGS. 3-6 provide cross-sectional views of exemplary cooling tubes that may be used with the present invention. Cooling tube 300 is the simplest configuration as it consists of a single coolant channel 301 within a relatively thin-walled conduit 303, both of which have a circular cross-section. While being simple to manufacture, for most applications cylindrical cooling tube 300 is the least preferable design as it provides minimal surface area that can be placed in proximity to batteries 203 which, in turn, limits the ability of cooling tube 300 to withdraw thermal energy from cells 203. To overcome this limitation, preferably the cooling tube utilizes an elongated design as illustrated in FIGS. 4-6, thereby providing a much greater surface area to place in contact with, or proximity to, the batteries to be cooled. The elongated design may utilize a single coolant channel 401 as shown in coolant tube 400, or utilize multiple coolant channels as illustrated in coolant tubes 500 and 600. The coolant channels may utilize any shape, for example channels with a circular cross-section (i.e., channels 501 in cooling tube 500) or channels with a substantially rectangular cross-section (i.e., channels 601 in cooling tube 600). Although four coolant channels are shown in the embodiments shown in FIGS. 5 and 6, it should be understood that the invention is not limited to a cooling tube, also referred to herein as a manifold, with a specific number of coolant channels. Some of the considerations that are taken into account in determining the optimum number of coolant channels within the assembly include; (i) the number of cells within the battery pack, (ii) the amount of thermal energy that the system is designed to handle, (iii) target battery pack weight, (iv) the intended application of the battery pack, (v) the form factor of the cells within the battery pack, and (vi) the cooling system to which the cooling manifold is coupled. Similar considerations are used in determining the optimal height 503 of the cooling tube. Preferably the height 503 is at least 20 percent of the overall height of the cell (e.g., cell 203) to which it is thermally coupled; more preferably height 503 is at least 30 percent of the overall height of the cell; still more preferably height 503 is at least 50 percent of the overall height of the cell; and yet still more preferably height 503 is at least 75 percent of the overall height of the cell.

In those embodiments in which the cooling tube includes multiple coolant channels, e.g., cooling tubes 500 and 600, and in which the assembly is coupled to an active thermal management system, preferably the direction of coolant flow within adjacent cooling channels alternates. Accordingly, in assembly 500 the direction of coolant flow in channels 501A is opposite the direction of flow in channels 501B and, similarly, in assembly 600 the direction of coolant flow in channels 601A is opposite the direction of flow in channels 601B. Alternating the coolant flow direction between channels allows heat transfer between opposing coolant channels, thereby providing a more uniform coolant temperature to the cells and improving overall thermal uniformity in the cells thermally coupled to the liquid cooling assembly.

In a battery pack comprised of tens to thousands of cells, typically the individual cells are held in place with the desired battery-to-battery spacing using a pair of cell mounting brackets, e.g., an upper and a lower mounting bracket. While the cell mounting brackets may constitute the entire battery pack housing, they are often integrated within a larger battery pack housing that provides additional environmental protection for the cells and cell interconnects as well as an improved battery pack mounting structure. It will be appreciated that a conventional battery pack may use any of a variety of means to hold the cells in place. For example, each cell mounting bracket may include a plurality of wells that are suitably sized to receive a portion of each cell, the wells being formed during bracket fabrication via molding, milling or other well-known processes. Alternately, the cell mounting brackets may use a plurality of locator tabs to hold the cells in place.

Regardless of the design and configuration of the cell mounting brackets and battery pack housing, in a typical battery pack assembly process the cells are first located within a first mounting bracket. Once the cells are secured in place, a cooling tube such as tube 201 is positioned between the cells. The second mounting bracket is then placed in position, followed by cell wiring, potting, etc.

The coolant tube is preferably fabricated from a material with sufficient strength to withstand the application of the outer thermal interface layer described below, the outer thermal interface layer preferably being applied by injection molding. Additionally, the material comprising the coolant tube should have a high thermal conductivity, thus ensuring that the thermal energy generated by the cells is efficiently transferred to the coolant within the coolant channels, while having minimal mass, thus minimizing the impact of the cooling system on the overall battery pack weight. Accordingly, in at least one preferred embodiment, the coolant tube (e.g., tubes 300, 400, 500 or 600) is fabricated from a metal such as aluminum, an aluminum alloy, steel or copper. It will be appreciated that the invention is not limited to metal cooling tubes, for example composites can be used that exhibit the desired thermal conductivity as well as the necessary strength to support the pressures associated with the overmolding process.

In accordance with the invention, the battery cooling tube (e.g., tubes 300, 400, 500 or 600) is overmolded with a thermal interface, the material and design of the thermal interface improving thermal transfer between the batteries and the cooling tube and the coolant contained therein. Additionally, the material comprising the thermal interface is electrically non-conductive, thus insuring that the inclusion of the cooling tube within the battery pack does not cause battery shorting, etc.

FIGS. 7-13 illustrate a preferred embodiment of the overmolded thermal interface of the invention. It will be understood that the disclosed thermal interface may utilize other designs, the choice of design determined primarily by the desired cross-section of the underlying cooling tube, the size and shape of the batteries, the distance between batteries as well as their relative locations within the battery pack (i.e., the packing configuration), and battery position and fabrication tolerances.

Figure 7:
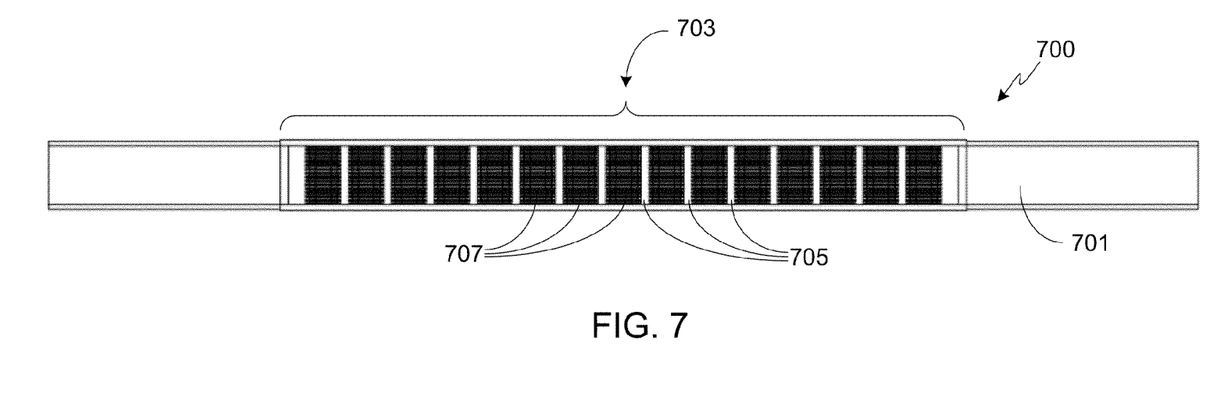
FIG. 7 is a side view of an elongated cooling tube with an overmolded thermal interface in accordance with the invention.
Figure 8:
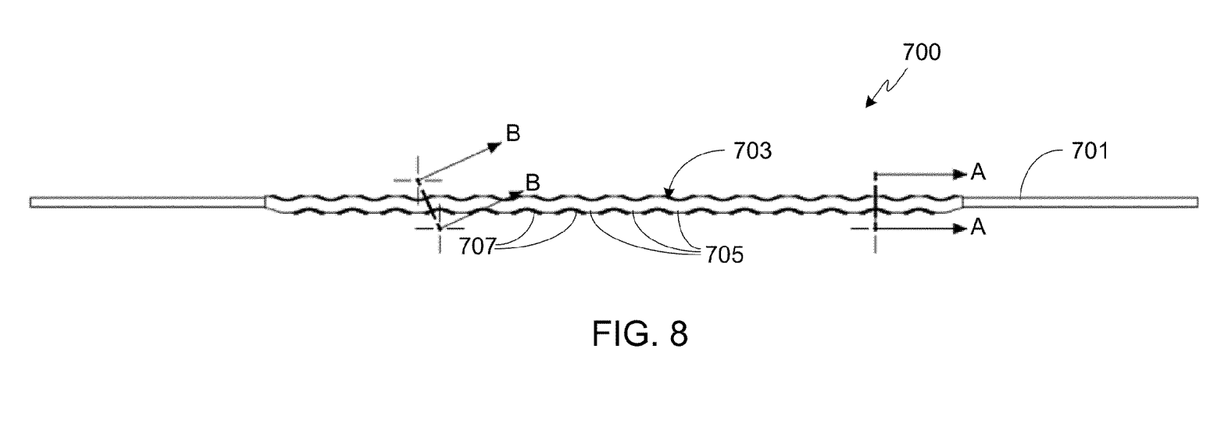
FIG. 8 is a top view of the cooling tube with overmolded thermal interface shown in FIG. 7.

FIGS. 7 and 8 provide side and top views, respectively, of an elongated, wavy cooling tube 701 that has been overmolded with a thermal interface 703. As previously noted, the cooling tube does not have to use a wavy design or an elongated cross-section to utilize the invention. Additionally, as these figures are only meant to illustrate the thermal interface, it should be understood that the cooling tube may utilize a different cross-section as well as a different assembly configuration. For example, the cooling tube could be configured to wrap back and forth within the battery pack, thereby passing between multiple rows of cells. Also, while either end of tube 701 is shown uncoated with thermal interface material, this is not a requirement of the invention or the process.

In the preferred embodiment, the thermal interface applied to the flat, elongated side surfaces of cooling tube 701 is comprised of alternating sections 705 and 707. Regions 705 have a flat coating of thermal interface material while regions 707 are comprised of a plurality of pliable fingers, also referred to herein as fins. These features are shown more clearly in FIGS. 9-13. While the entire coated surface may include the finger structures, the inclusion of regions 705 is preferred for several reasons. First, regions 705 conserve material, thus reducing manufacturing cost while lowering the mass of the finished component. Second, regions 705 may be used during battery pack fabrication to properly locate the cooling tube assembly within the battery pack.

Figure 9:
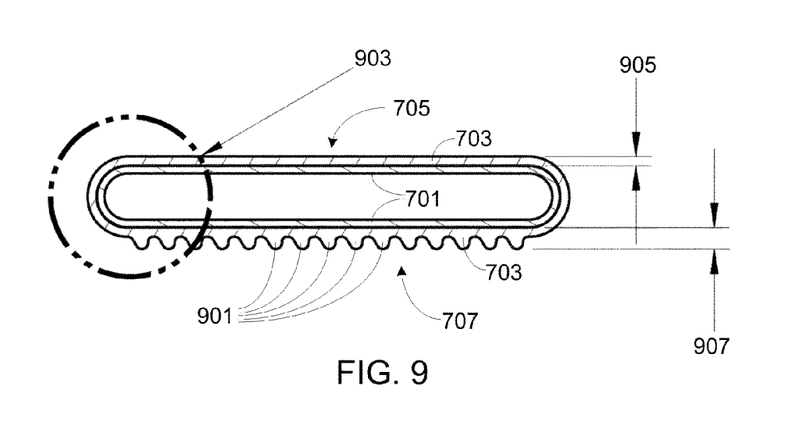
FIG. 9 is a cross-sectional view of a portion of the cooling tube and overmolded thermal interface shown in FIGS. 7 and 8.
Figure 10:
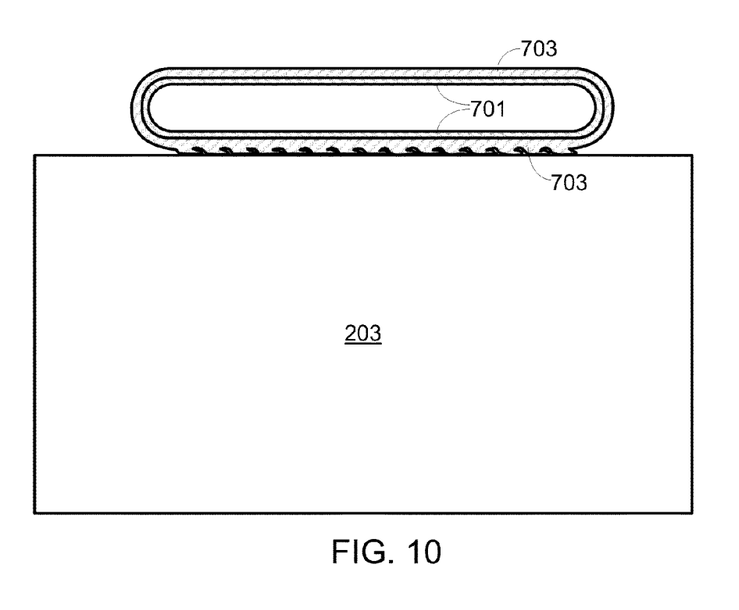
FIG. 10 provides the same view as that shown in FIG. 9, with the inclusion of a portion of a battery, this figure illustrating the deflection of the thermal interface fingers.

FIG. 9 provides a cross-sectional view of cooling tube assembly 700 taken along line A-A. This figure shows flat region 705 as well as non-flat region 707. As previously noted, non-flat region 707 is comprised of a plurality of fingers 901 that extend away from the side surface of cooling tube 701. In at least one preferred embodiment, fingers 901 are normal, or substantially normal, to the side surface of tube 701. The primary purpose of fingers 901 is to improve the transfer of thermal energy from the batteries to the coolant within tube 701 by improving the thermal contact between the thermal interface layer 703 and the external surfaces of the batteries 203 (not shown in FIGS. 7-9 and 11-13). In particular, the use of fin-like structures 901 extending away from the surface and formed from the pliable thermal interface material allows the fingers to deflect when the cooling tube assembly is properly located between the cells comprising the battery pack. The deflection of fingers 901 insures a good thermal contact is achieved between interface 703 and the cells regardless of minor variations in cell location and/or cell dimensions that may arise due to manufacturing tolerances. FIG. 10 shows the same view as that provided in FIG. 9 with the inclusion of at least a portion of a cell 203, this figure showing fingers 901 in a deflected state. Note that due to the deflection of fingers 901, cell 203 is in firm contact with almost a continuous surface of the thermal interface. Without the inclusion of fingers 901, it would be extremely difficult to achieve this level of contact between the thermal interface layer 703 and the cells.

Figure 11:
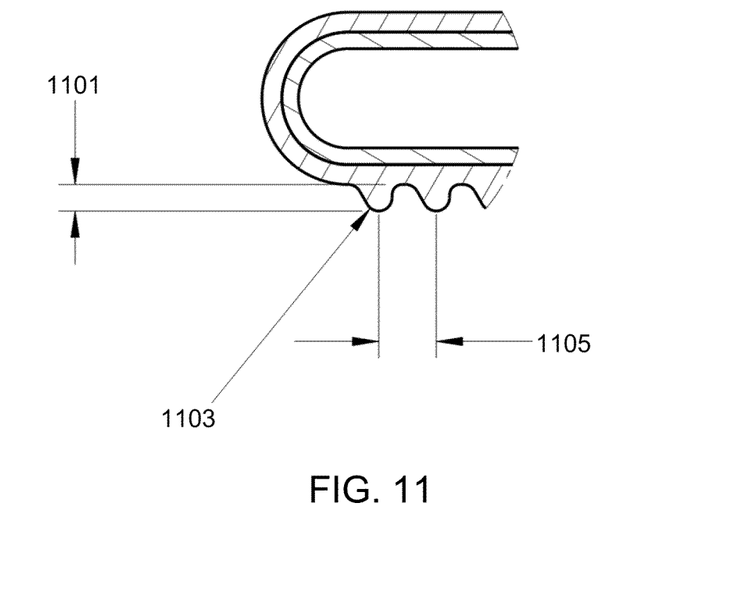
FIG. 11 is a detailed cross-sectional view of a portion of the cross-section shown in FIG. 9.
Figure 12:
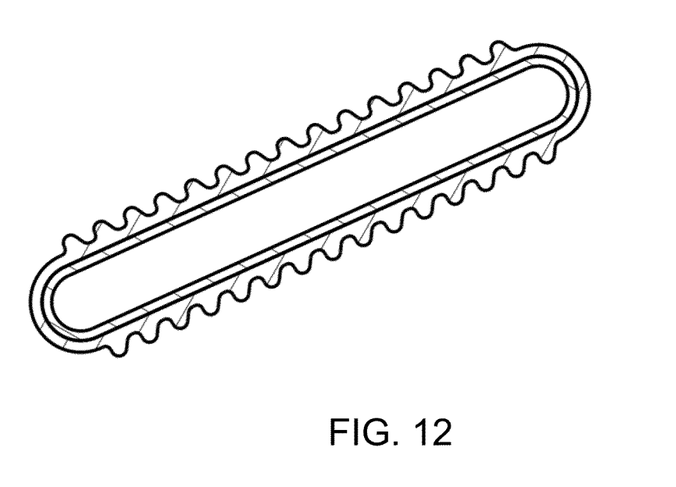
FIG. 12 is a cross-sectional view of an alternate portion of the cooling tube and overmolded thermal interface shown in FIGS. 7 and 8.
Figure 13:
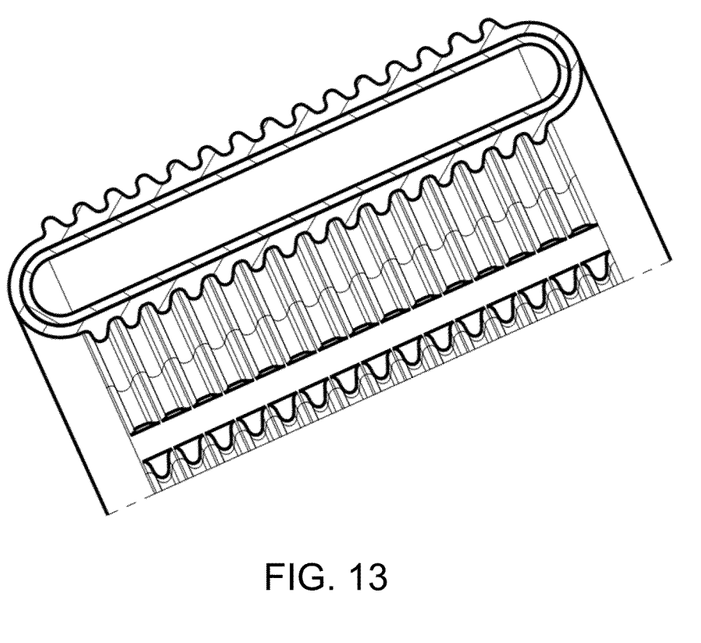
FIG. 13 provides a perspective view of the portion of the cooling tube and overmolded thermal interface shown in FIG. 12.

FIG. 11 provides a detailed view of a portion 903 of the cross-sectional view shown in FIG. 9. FIG. 12 provides a cross-sectional view of cooling tube assembly 700 taken along line B-B. FIG. 13 provides a perspective, cross-sectional view of the portion of cooling tube assembly 700 shown in FIG. 12.

Figure 14:
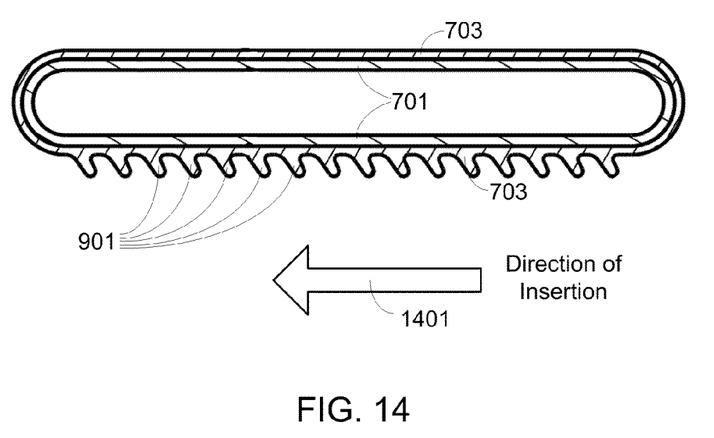
FIG. 14 provides a cross-sectional view of an alternate thermal interface finger arrangement.
Figure 15:
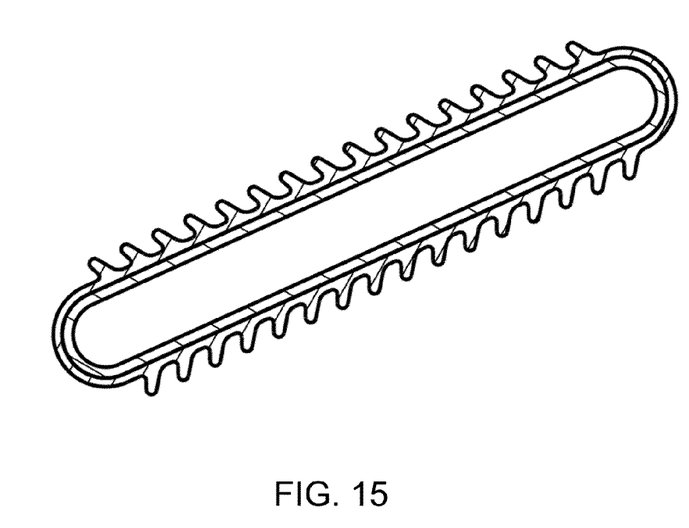
FIG. 15 provides a cross-sectional view of the alternate thermal interface finger arrangement shown in FIG. 14 taken at a different position of the cooling tube assembly.

FIGS. 14 and 15 illustrate a minor variation of the previous embodiment which utilizes angled fingers 901. FIG. 14 provides a cross-sectional view of cooling tube assembly 700 taken along line A-A, this figure showing fingers 901 angled away from the normal. Preferably the angle of fingers 901 in this embodiment is between 30 and 60 degrees off normal. During insertion between two rows of cells, preferably fingers 901 angle away from the direction of insertion 1401 as shown. The inventors have found that angling fingers 901 aids during insertion of the cooling tube assembly within the battery pack. Additionally, the angled fingers tend to fold in a more controlled fashion, thereby avoiding bunching which can impact the thermal properties of the interface. FIG. 15 illustrates the same angled fingers 901, this view taken along line B-B of the cooling tube assembly 700.

In the embodiments illustrated in FIGS. 7-15, cooling tube 701 has a cross-section of approximately 30 millimeters by 4 millimeters and the thermal interface layer 703 has a minimum thickness 905 of approximately 0.6 millimeters. The maximum thermal interface layer thickness 907, measured with the fingers 901 in an un-deflected state, is approximately 1.4 millimeters. Therefore in this embodiment, the individual fingers 901 in their un-deflected state have a thickness 1101 of approximately 0.8 millimeters. The end surface of each finger 901 preferably has a radius of curvature 1103 of approximately 0.4 millimeters, thus insuring that the cooling tube assembly can be easily positioned within the battery pack, or removed from the battery pack, without snagging the individual fingers. For this configuration, a finger to finger spacing 1105 of between 1.5 and 2.5 millimeters has been found to provide optimal thermal contact between interface layer 703 and cells 203 once the cooling tube assembly is in place within the battery pack.

Preferably thermal interface layer 703 is comprised of an electrically non-conductive, high dielectric material in order to prevent shorting between cells. Preferably thermal interface layer 703 has a dielectric strength of at least 1 kV-mm$^{-1}$; more preferably, at least 3 kV-mm$^{-1}$; still more preferably, at least 7 kV-mm$^{-1}$; and yet still more preferably, at least 10 kV-mm$^{-1}$. In order to adequately transfer thermal energy from cells 203 to the cooling tube and the coolant contained therein, preferably the thermal conductivity of thermal interface layer 703 is greater than 0.2 W-m$^{-1}$K$^{-1}$, more preferably greater than 0.4 W-m$^{-1}$K$^{-1}$, still more preferably greater than 1 W-m$^{-1}$K$^{-1}$, and yet still more preferably greater than 5 W-m$^{-1}$K$^{-1}$. In order to allow fingers 901 to deflect during positioning of the coolant tube assembly within the battery pack, thereby insuring that good thermal contact is achieved, preferably the thermal interface material has a Shore A hardness value of less than 90; more preferably less than 60; still more preferably less than 45; and yet still more preferably less than 30. In order to prevent thermal interface 703 from ripping, tearing, or otherwise losing or disrupting its dielectric or thermal properties during assembly, preferably the material comprising layer 703 is tear resistant and has a high tensile strength (e.g., preferably greater than 5 MPa, and more preferably greater than 10 MPa). Preferably thermal interface layer 703 also has a relatively low surface friction, thus allowing the cooling tube/thermal interface assembly (e.g., assembly 700) to be easily inserted between adjacent cell rows. For example, preferably the static coefficient of friction between layer 703 and a cell's outer surface is less than 0.3. It will be appreciated that there are a variety of elastomeric resins that meet the material requirements described above and that may be used to overmold thermal interface layer 703 onto the cooling tube. Exemplary materials include various silicone elastomer blends (SEBs) and thermoplastic elastomers (TPEs), although polyurethanes and acrylic-based materials may also be used. Note that in some cases additives may be required to meet one or more of the desired material characteristics for thermal interface layer 703. For example, a ceramic filler such as alumina or boron nitride may be added to increase the thermal conductivity of the selected elastomer.

Although the cells in the illustrated embodiments have a cylindrical form, e.g., an 18650 form-factor, as previously noted the invention may be used with other cell designs, shapes, configurations and form-factors. Additionally, the invention is not limited to a battery pack with a specific number of cells, a specific cell interconnect arrangement, or a specific battery pack configuration.

Figure 16:
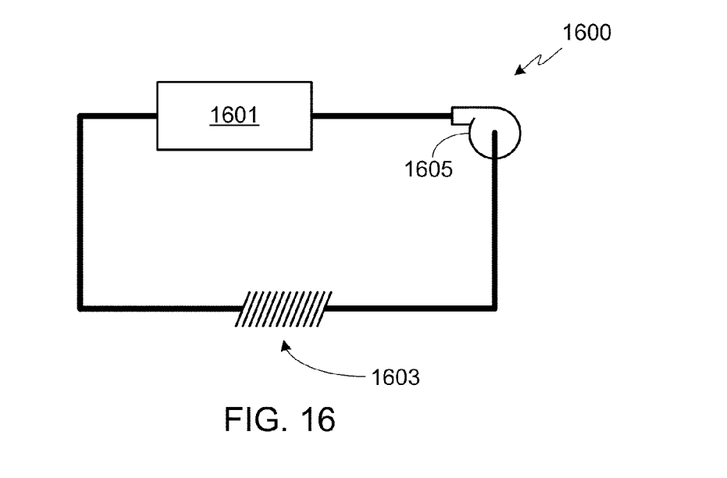
FIG. 16 illustrates a cooling tube/thermal interface assembly of the invention coupled to a cooling system.
Figure 17:
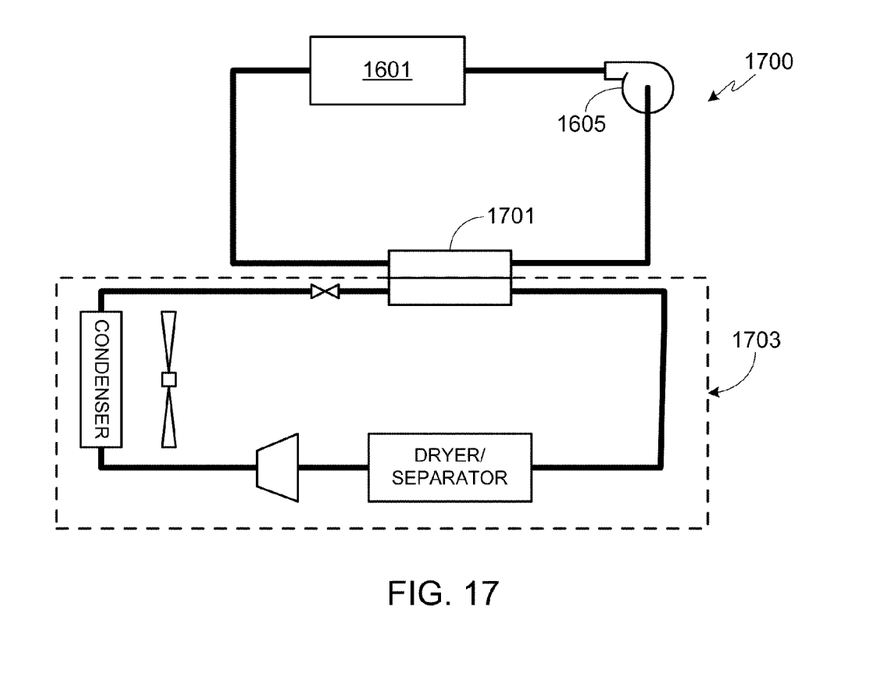
FIG. 17 illustrates a cooling tube/thermal interface assembly of the invention coupled to an alternate cooling system.

As previously noted, a cooling manifold assembly utilizing the cooling tube and overmolded thermal interface layer of the present invention may be coupled to any of a variety of different cooling systems. FIGS. 16 and 17 illustrate two such cooling systems. In the embodiment illustrated in FIG. 16, the cooling manifold assembly within battery pack 1601 is coupled to a radiator 1603. Cooling system 1600 may be completely passive or utilize a coolant pump 1605 as shown. In the embodiment illustrated in FIG. 17, the liquid cooling manifold assembly within battery pack 1601 is coupled via a heat exchanger 1701 to a thermal management system 1703. Thermal management system 1703 may utilize a refrigeration system or other means as previously described.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A thermal management system for use with a battery pack, the battery pack comprised of a plurality of cells arranged into at least a first row of cells and a second row of cells, wherein said first row of cells is adjacent to said second row of cells, said system comprising:
   a cooling manifold assembly interposed between said first and second rows of cells, said cooling manifold assembly comprising;
   a coolant tube, said coolant tube including at least one coolant channel, wherein said coolant tube is comprised of a first surface adjacent to said first row of cells and a second surface adjacent to said second row of cells; and
   a thermal interface layer overmolded onto said coolant tube, wherein said thermal interface layer is comprised of a plurality of pliable fingers that extend away from said coolant tube, wherein said plurality of pliable fingers are interposed between said first surface of said cooling tube and said first row of cells and between said second surface of said cooling tube and said second row of cells, and wherein said plurality of pliable fingers are deflected by and in thermal contact with said first and second rows of cells.

2. The thermal management system of claim 1, wherein said first row of cells is offset from said second row of cells.

3. The thermal management system of claim 2, wherein said coolant tube is comprised of a first plurality of contours coinciding with said cells of said first row of cells and a second plurality of contours coinciding with said cells of said second row of cells, and wherein said first and second pluralities of contours alternate.

4. The thermal management system of claim 3, wherein a radius of curvature corresponding to each of said first and second pluralities of contours is approximately equal to an outer radius of curvature of said cells.

5. The thermal management system of claim 1, wherein said thermal interface layer is comprised of a material with a dielectric strength of at least 3 kV-mm$^{-1}$.

6. The thermal management system of claim 1, wherein said thermal interface layer is comprised of a material with a dielectric strength of at least 7 kV-mm$^{-1}$.

7. The thermal management system of claim 1, wherein said thermal interface layer is comprised of a material with a thermal conductivity of greater than 0.2 W-m$^{-1}$K$^{-1}$.

8. The thermal management system of claim 1, wherein said thermal interface layer is comprised of a material with a thermal conductivity of greater than 1.0 W-m$^{-1}$K$^{-1}$.

9. The thermal management system of claim 1, wherein said thermal interface layer is comprised of a material with a Shore A hardness value of less than 60.

10. The thermal management system of claim 1, wherein said thermal interface layer is comprised of a material with a tensile strength greater than 5 MPa.

11. The thermal management system of claim 1, wherein a static coefficient of friction between said thermal interface layer and a cell surface is less than 0.3.

12. The thermal management system of claim 1, wherein said thermal interface layer is comprised of a material selected from the group consisting of silicone elastomer blends and thermoplastic elastomers.

13. The thermal management system of claim 1, wherein said cooling tube is fabricated from a metal.

14. The thermal management system of claim 1, wherein said cooling tube is fabricated from a material selected from the group consisting of aluminum, aluminum alloy, steel or copper.

15. The thermal management system of claim 1, wherein said cooling tube has an elongated cross-section, and wherein said first and second surfaces of said cooling tube correspond to elongated side surfaces of said cooling tube.

16. The thermal management system of claim 1, wherein said cooling tube includes a single coolant channel.

17. The thermal management system of claim 1, wherein said cooling tube includes at least a first coolant channel and a second coolant channel.

18. The thermal management system of claim 17, wherein coolant flows in said first coolant channel in a first direction and coolant flows in said second coolant channel in a second direction, wherein said first direction is opposite to said second direction.

19. The thermal management system of claim 1, wherein said cooling manifold assembly is coupled to a vehicle battery cooling system.

20. The thermal management system of claim 1, wherein said plurality of cells are cylindrically shaped.

21. The thermal management system of claim 1, wherein said plurality of pliable fingers are substantially normal to said coolant tube.

22. The thermal management system of claim 1, wherein said plurality of pliable fingers are angled between 30 and 60 degrees off normal.

* * * * *